(12) United States Patent
Luo et al.

(10) Patent No.: US 8,054,534 B2
(45) Date of Patent: Nov. 8, 2011

(54) ELECTROPHORETIC DISPLAY

(75) Inventors: Ying Luo, Shenzhen (CN); Kuan-Hong Hsieh, Taipei Hsien (TW); Chun-Wei Pan, Taipei Hsien (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 10 days.

(21) Appl. No.: 12/650,425

(22) Filed: Dec. 30, 2009

(65) Prior Publication Data

US 2011/0069372 A1    Mar. 24, 2011

(30) Foreign Application Priority Data

Sep. 23, 2009  (CN) .......................... 2009 1 0307522

(51) Int. Cl.
*G02B 26/00* (2006.01)
*G09G 3/34* (2006.01)

(52) U.S. Cl. ........................................ 359/296; 345/107
(58) Field of Classification Search .................. 359/296; 345/107

See application file for complete search history.

(56) References Cited

U.S. PATENT DOCUMENTS

| 6,987,603 B2 * | 1/2006 | Paolini et al. ................. 359/296 |
| 7,839,563 B1 * | 11/2010 | Luo et al. ...................... 359/296 |
| 2003/0035199 A1 * | 2/2003 | Liang et al. .................... 359/296 |

* cited by examiner

*Primary Examiner* — Evelyn A. Lester
(74) *Attorney, Agent, or Firm* — Altis Law Group, Inc.

(57) ABSTRACT

An electrophoretic paper device is provided. The electrophoretic paper device includes a plurality of pixel electrodes arranged on a lower substrate. The electrophoretic paper device also includes an upper substrate having a common electrode that covers an entire area corresponding to a display surface. The electrophoretic paper device further includes an electrophoretic ink layer, which includes a plurality of tubular cavities and each of the tubular cavities contains suspension fluid and a plurality of charged pigment particles dispersed in the suspension fluid.

9 Claims, 4 Drawing Sheets

ELECTROPHORETIC DISPLAY

BACKGROUND

1. Technical Field

The present disclosure relates to an electrophoretic display.

2. Description of Related Art

Electrophoretic effects are well known among scientists and engineers, wherein charged particles dispersed in a fluid or liquid medium move under the influence of an electric field. As an example of the application of the electrophoretic effects, engineers try to realize displays by using charged pigment particles that are dispersed and contained in dyed solution arranged between a pair of electrodes. Under the influence of an electric field, the charged pigment particles are attracted to one of the electrodes, so that desired images will be displayed. The dyed solution in which charged pigment particles are dispersed is called electrophoretic ink, and the display using the electrophoretic ink is called an electrophoretic display (abbreviated as EPD). It is desirable to provide a new type of electrophoretic display.

BRIEF DESCRIPTION OF THE DRAWINGS

The components in the drawings are not necessarily drawn to scale, the emphasis instead being placed upon clearly illustrating the principles of the electrophoretic display. Moreover, in the drawings, like reference numerals designate corresponding parts throughout the several views.

DETAILED DESCRIPTION

Figure 1:
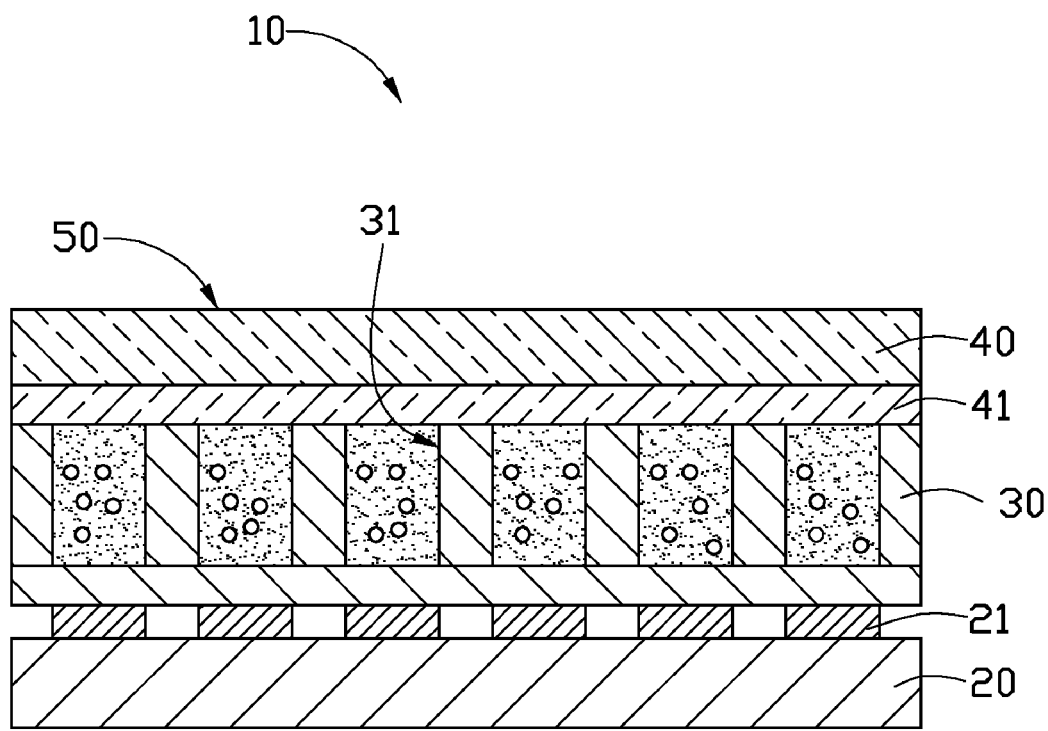
FIG. 1 is a cross-sectional view showing an electrophoretic display device in accordance with an exemplary embodiment.

Referring to FIG. 1, an electrophoretic display device 10 includes a lower substrate 20, an electrophoretic ink layer 30, and an upper substrate 40. The lower substrate 20 and the upper substrate 40 are fixed by bonding and are arranged opposite to each other. The electrophoretic ink layer 30 is disposed between the lower substrate 20 and the upper substrate 40.

The lower substrate 20 can be made of plastic, glass, etc. A plurality of pixel electrodes 21 are formed between the electrophoretic ink layer 30 and the lower substrate 20.

A transparent electrode 41 is formed just between the upper substrate 40 and the electrophoretic ink layer 30, which corresponds to a display surface 50 to be visually observed by a person such as a human operator. The transparent electrode 41 is used as a common electrode. The transparent electrode 41 can be made of indium tin oxide.

The electrophoretic ink layer 30 includes a plurality of tubular cavities 31. In the exemplary embodiment, the tubular cavities 31 are parallel to each other and are perpendicular to the display surface. The tubular cavities 31 are arranged in a matrix form.

Figure 2:
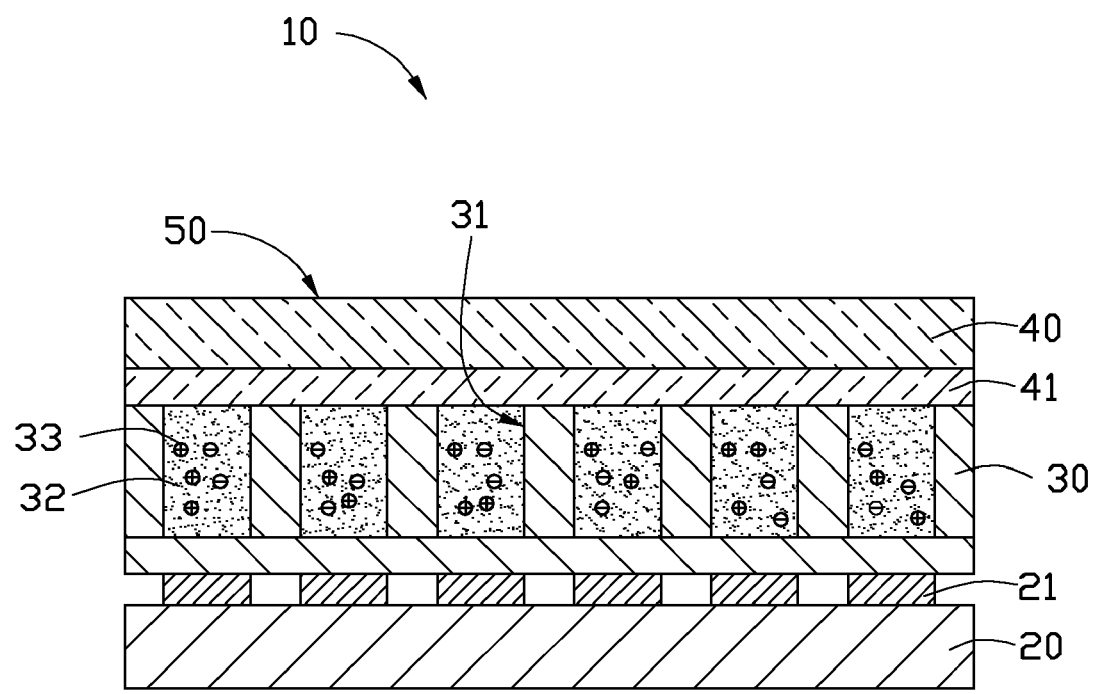
FIG. 2 shows a cross-sectional view showing an electrophoretic display device in accordance with a second exemplary embodiment.
Figure 3:
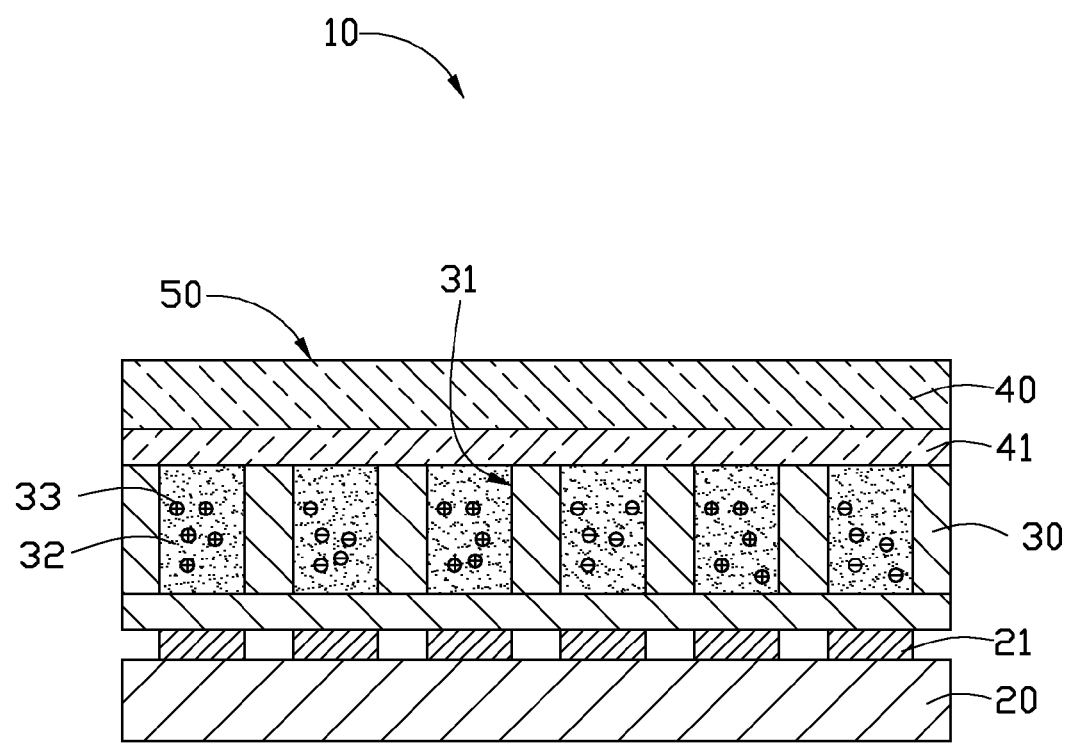
FIG. 3 is a cross-sectional view showing an electrophoretic display device in accordance with a third embodiment.

Referring to FIGS. 2 and 3, each tubular cavity 31 is formed above one pixel electrode 21. The tubular cavity 31 contains suspension fluid 32 and charged pigment particles 33 dispersed in the suspension fluid 32. The charged pigment particles 33 include positively charged white particles and negatively charged black particles. In another embodiment, each pixel of the electrophoretic display device 10 includes two cavities 31. The two cavities 31 contain positively charged white particles and negatively charged black particles, respectively.

Upon applying voltage between the pixel electrodes 21 and the transparent electrode 41, the charged pigment particles 33 are controlled to move to the transparent electrode 41 to form images displayed on the display device 10.

Figure 4:
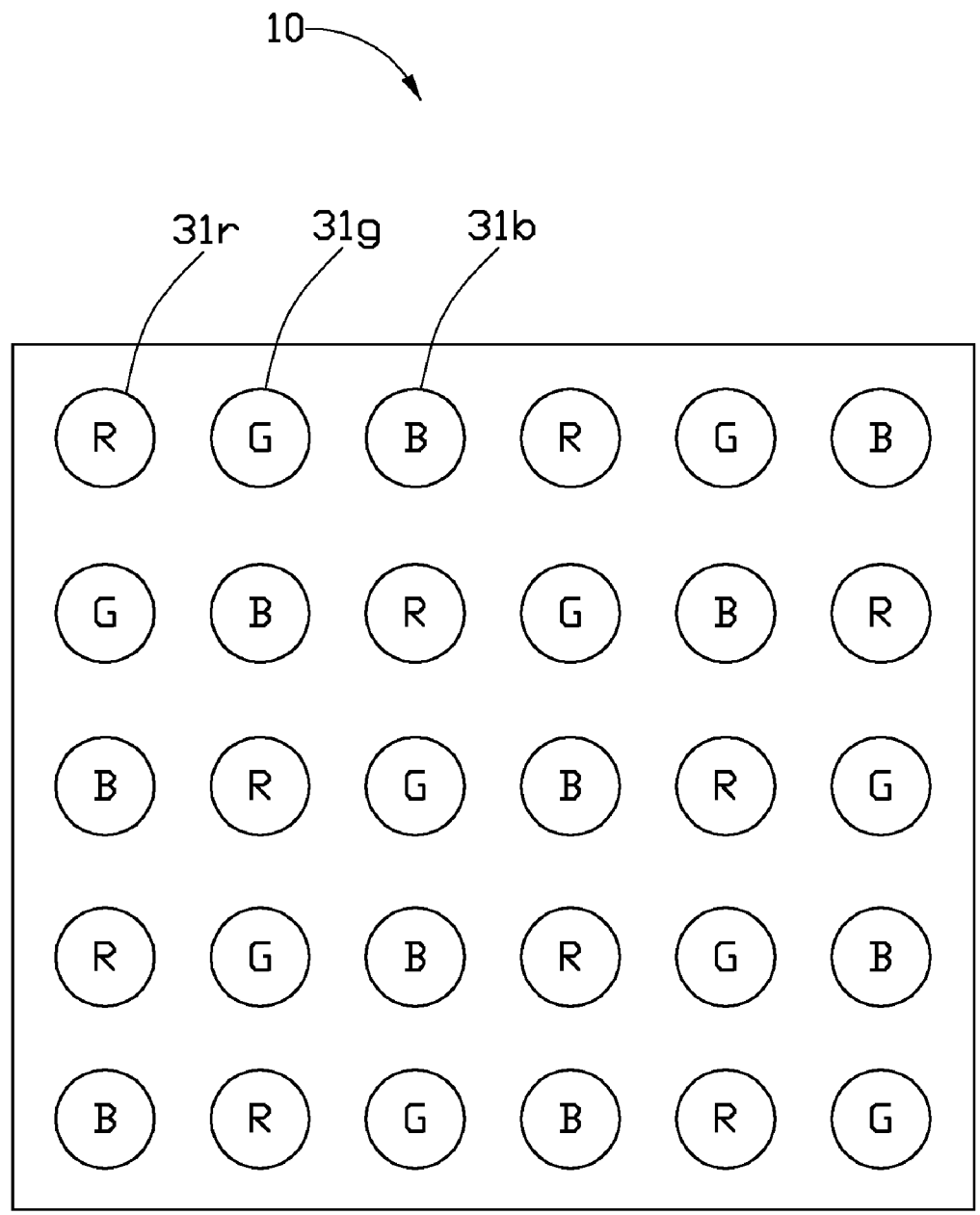
FIG. 4 is a planar view of an electrophoretic display device in accordance with an exemplary embodiment.

Referring to FIG. 4, in another embodiment, each pixel of the display device 10 includes three tubular cavities $31r$, $31g$, and $31b$. The three tubular cavities $31r$, $31g$, $31b$ include red charged particles, green charged particles, and blue charged particles, respectively. The manner of arrangement of the three tubular cavities $31r$, $31g$, and $31b$ are not limited. For example, as shown in FIG. 4, the cavities $31r$, $31g$, and $31b$ are arranged from left to right in the pixel in the upper left corner, while the cavities $31r$, $31b$, and $31g$ are arranged from left to right in the pixel in the lower right corner.

When applying voltage between the transparent electrodes 41 and the pixel electrodes 21, the red, green, and blue particles are controlled to move. The amount of the red, green, and blue particles moving to the transparent electrode 41 is controlled by the amplitude of the applied voltage. Take one pixel for example, when the voltages applied to the cavities $31r$, $31g$, and $31b$ are equal, the amount of red, green, and blue particles moving to the transparent electrode 41 is substantially the same, the pixel appears white. When the voltages applied to the cavities $31r$, $31g$, and $31b$ are different from each other, different amounts of the red, green, and blue particles move to the transparent electrode 41 producing other viewable colors. Accordingly, by controlling the amplitude of the applied voltage, the pixel can display any desired color by controlling the red, green, and blue particle combinations moved to the transparent electrode 41.

While various embodiments have been described and illustrated, the disclosure is not to be constructed as being limited thereto. Various modifications can be made to the embodiments by those skilled in the art without departing from the true spirit and scope of the disclosure as defined by the appended claims.

What is claimed is:

1. An electrophoretic display device comprising:
   a plurality of pixel electrodes arranged on a lower substrate;
   a lower sheet arranged on the plurality of pixel electrodes;
   an upper substrate having a common electrode that covers an entire area corresponding to a display surface; and
   an electrophoretic ink layer, wherein the electrophoretic ink layer is sandwiched between the common electrode and the lower sheet; the electrophoretic ink layer includes a plurality of tubular cavities passing therethrough, the plurality of tubular cavities are covered by the common electrode and the lower sheet to be closed; and each of the tubular cavities contains suspension fluid and a plurality of charged pigment particles dispersed in the suspension fluid.

2. The electrophoretic display device according to claim 1, wherein each of the plurality of tubular cavities is formed perpendicular to the display surface.

3. The electrophoretic display device according to claim 1, wherein the plurality of charged pigment particles contained in a tubular cavity comprises white particles and black particles, the white particles are positively charged and the black particles are negatively charged.

4. The electrophoretic display device according to claim 1, further comprising a plurality of pixels, wherein each pixel comprises two tubular cavities, the two tubular cavities contain positively charged white particles and negatively charged black particles, respectively.

5. The electrophoretic display device according to claim 1, further comprising a plurality of pixels, wherein each pixel comprises three tubular cavities, the three tubular cavities contain red, green, and blue particles, respectively.

6. The electrophoretic display device according to claim 1, wherein the plurality of cavities are parallel to each other.

7. The electrophoretic display device according to claim 1, wherein the common electrode is made of indium tin oxide.

8. The electrophoretic display device according to claim 1, wherein the plurality of cavities are arranged in a matrix form.

9. The electrophoretic display device according to claim 1, wherein the lower substrate is made of glass or plastic.

* * * * *